G. H. FATH.
BOOK AND BOOK LEAF FOR HOLDING FISHING FLIES AND BAIT HOOKS HAVING SNELLS.
APPLICATION FILED JUNE 1, 1914.

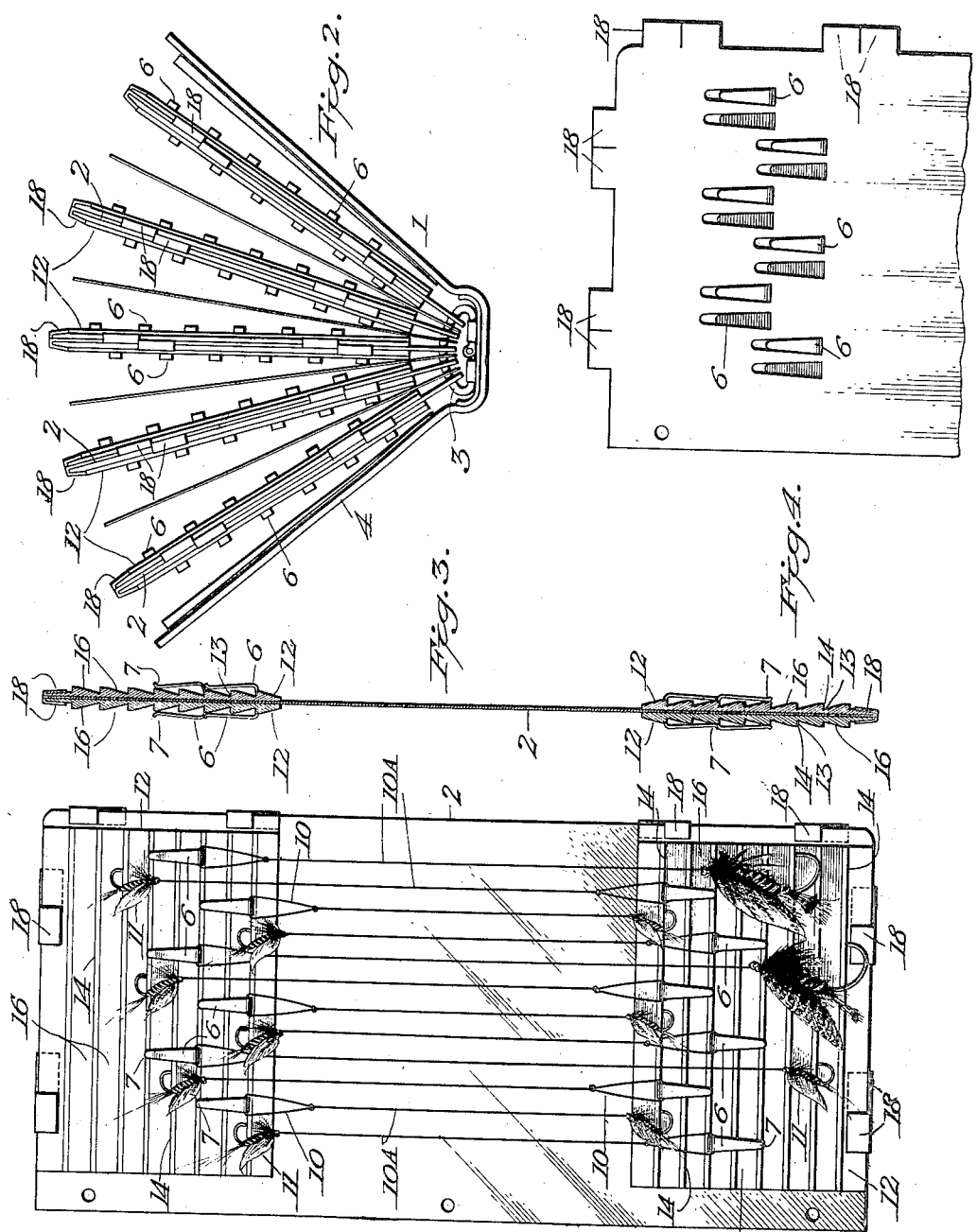

1,133,846.

Patented Mar. 30, 1915.

2 SHEETS—SHEET 2.

UNITED STATES PATENT OFFICE.

GEORGE H. FATH, OF DENVER, COLORADO.

BOOK AND BOOK-LEAF FOR HOLDING FISHING-FLIES AND BAIT-HOOKS HAVING SNELLS.

1,133,846.     Specification of Letters Patent.     Patented Mar. 30, 1915.

Application filed June 1, 1914. Serial No. 842,157.

*To all whom it may concern:*

Be it known that I, GEORGE H. FATH, a citizen of the United States of America, residing in the city and county of Denver and State of Colorado, have invented a new and useful Book and Book-Leaf for Holding Fishing-Flies and Bait-Hooks Having Snells, of which the following is a specification.

Figure 5:
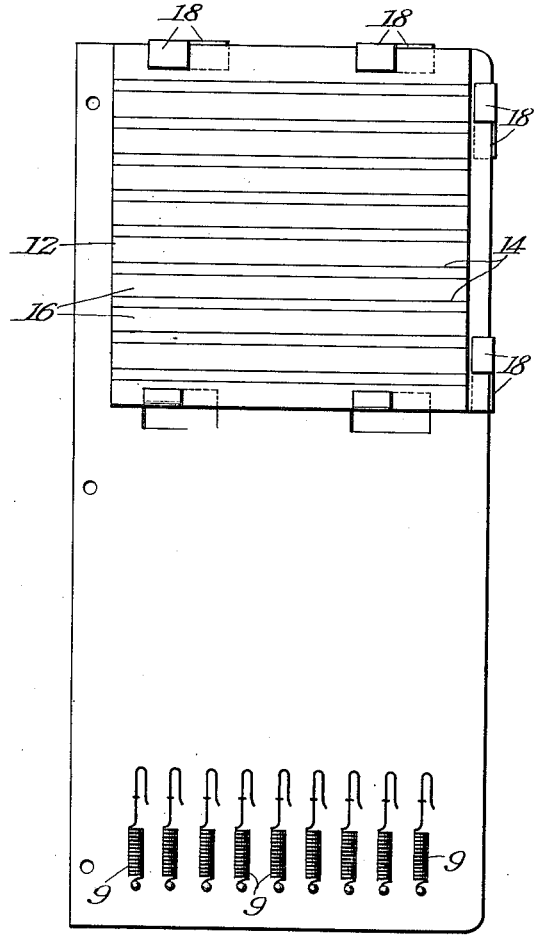
Figure 6:
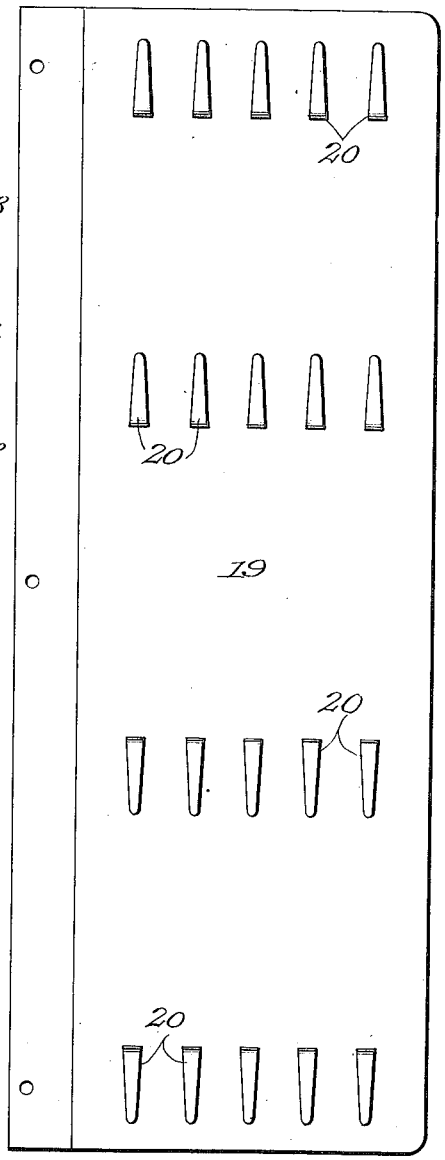

My invention relates to improvements in books and in book leaves for holding trout and bass fishing flies and bait hooks; and the objects of my invention are: First, to provide a fly and other hook holding leaf for fly or bait hook holding books, that is provided with pads of anti-hook-point-rusting material, in which artificially dressed fish hooks, called flies and also bait and spinner hooks of various kinds and sizes and provided with snells of various lengths having loops at their free ends, can be held at equal distances apart relative to each other, and also be removably secured in a separated and orderly manner on each side of each leaf in the book. Second, to provide a fly or a bait hook book leaf, in which the points of the hooks are embedded in a naturally anti-hook-rusting material. And third, to provide a loose fly and bait hook leaf and also to provide a loose leaf fly and bait hook holding book to which loose fly and bait hook supporting leaves may be added at any time to give additional hook holding capacity, or may be removed to replace worn out or damaged leaves. I attain these objects by the mechanism illustrated in the accompanying drawings, in which:

Figure 1 is a view of a fly book leaf constructed in accordance with my invention and showing the manner of attaching flies or other hooks having snells. Fig. 2 is an end view of a fly book equipped with the improved style of leaf. Fig. 3 is a vertical, longitudinal sectional view of a leaf. Fig. 4 is a view of one end of a leaf, showing the manner of forming the snell receiving hooks thereon, the cork pads being removed. Fig. 5 is a view of a leaf arranged with a pad or pads on one end only, the opposite end of the leaf being provided with resilient hooks for receiving the looped ends of the snells; and Fig. 6 is a view of a leaf provided with a pad extending the whole length thereof, and with an arrangement of snell holding hooks adapted for long snells.

Referring to the drawings,—the numeral 1 designates a fly book embodying my invention. One of the objects of my invention is to produce a loose leaf 2, for holding fly, bait, spinner, and other fishing hooks having loop ended snells, the snells of which are of unequal lengths, and to provide leaves that can be inserted on suitable loose leaf book rings 3, or clasps or clips, such as are suitable for use in loose leaf book-like covers 4, which may be of any suitable material or design. My invention, however, contemplates two leading and essential features, to-wit: the providing of a fish hook point cushioning or penetrating pad or pad-like material in which the points of the hooks may be pressed and embedded, and that acts to always keep the points and barbs of the hooks clean, bright, and free from rust even if the points of the hooks are applied to them when they are wet, and which will in case hooks are applied to it with their points slightly rusty, tend to clean them of it and prevent them from further rusting; and the production of a hook holding leaf and book, as shown in Figs. 1, 2, and 3, that will support a large number of fly and bait hooks having loop ended snells, and in which snells of a large range of varying lengths can be supported in a straight orderly arrangement in which they will be independent of each other.

While my improved fly and other fish hook supporting book is especially designed as a loose leaf book member to be made up into and added at any time to books constructed on the loose leaf principle, yet my invention contemplates fly and other hook supporting leaves arranged to be sewed or bound in any way either in book form or to and between the covers of books as ordinarily made, or to be made up between suitable covers, as the commonly used fly books are made. I preferably, however, embody my invention in loose leaf form of book leaves, in order that the leaves in a fisherman's book may be added to by inserting extra ones, as his stock of flies and bait hooks increases from year to year, which is almost invariably the case.

In carrying out this feature of my invention, I employ a leaf having a body or core portion 2, which forms the center of the complete leaf. This body or core portion may be made of any suitable material. I preferably, however, employ for this purpose aluminum rolled to have as resilient a temper as can be given to this metal. Instead of at both ends, and if desired a resilient movement to compensate for fixed distances between hook point fastenings and these snell receiving hooks may be provided, such as by springs 9. (See Fig. 5). As illustrated, however, in Figs. 1 and 2, they are fixed relatively to the hook point receiving parts of the pads.

In either one or both ends I form hooks 6, by cutting long tongue portions loose from the aluminum which frees the two sides and one end of the tongue, and then I raise and bend these tongue portions to form hooks, the free ends of which are pointed toward the opposite ends of the body or core portion, and I preferably bend and shape each of these hooks so that their free ends 7 will be raised slightly above the flat adjacent surface of the aluminum, so that it will be easy for a fisherman to place the end of a finger under it and raise it while the hook immediately back of this bent-up end is bent in a short curve, down far enough to rest against the surface of the cushioning pads when they are used on both ends of the leaves and against the aluminum body portion of the leaf when the cushioning pads are used only on one end of the leaves, with a slight resilient tension, which forms a stop shoulder that prevents the snells from accidentally unlocking from them, as will be fully explained hereinafter. The body portion of these long snell holding hooks is adapted to receive the loop ends 10 of the snells 10^A of flies 11, which are placed on the hooks by placing their loop ends 10 over the upturned end of a hook and pulling until it raises the curved end that bears against the aluminum enough to allow the loop to pass on to the body of the hook. The downward bearing tension of this sharp curved portion is sufficient to prevent the loops from coming off, and consequently the loops can easily be pulled under the ends of the hooks. As many of these hooks may be cut free from the aluminum body portion of the leaf as desired, and some of them, preferably an even number of them, should be bent to form hooks on one side of the aluminum, and the other half on the other side. These snell loop holding hooks may be arranged in straight rows arranged to side step or zigzag or in random order, as desired on the pads, when pads are used on both ends, and directly on the body of the leaf when the pads are placed on the opposite sides of one end of the body portion only. My invention, however, contemplates these hooks made of metal and attached to the body portion, which may, if desired, be made of some other metal or material besides aluminum, in case I find it desirable to use this construction rather than the one in which the hook is cut integrally from aluminum or some other suitable metal.

As illustrated, I have shown a leaf having snell loop attaching hooks provided at both ends, but if desired these snell loop securing hooks may be all confined to one end of the leaf, and the fly or other fish catching hooks be all secured to the opposite end in- Having formed the snell receiving and holding hooks out of metal of the body portion of the leaves, or secured independently made hooks to them, as the case may be, the opposite sides of this body or core portion of the leaf are provided with hook point receiving cushions 12, which are preferably made in flat pad form, but which may be made in any suitable form. These hook point cushions are made of and consist of pieces of fine grained bark-cork, but my invention contemplates in this essential feature of it any other suitable natural or artificially made substance, such for instance as soft, porous rubber, papier-mâché, soft wood pulp and other substances that will make good hook point receiving cushions. I preferably, however, use fine grained bark-cork for these pads, which are formed in thin square pads, as it is light of weight and will dry the points and barbs of the hooks in case they are wet, and it will keep them from rusting in damp air, or in case the fly book is accidentally dropped in the water while a user is fishing, which sometimes happens. These hook point receiving cushioning pads are each preferably provided with a plurality of transversely arranged grooves or channels 13, that are provided with shouldered wall surfaces 14, on their sides nearest the center of the length of the body portion of the leaf, which are arranged at or substantially at right angles to the top side surfaces of the leaf or of its core or body portion. These grooves or channels 13 are also provided with tapered or beveled surfaces 16, on their outer sides, that slope up to the top surface of the pads. These cushioning pads are provided with apertures, that permit the hook tongues of the aluminum body portion of the leaf to be inserted through them before they are bent into their final hook shape, when cork pads are used on both ends and both sides of the leaves. Consequently they are in a measure secured to the aluminum body portion of the leaf by the hooks, but are also secured by other suitable means such as by tongues 18, at their opposite ends and at their outer side edge corners. These tongues are made of strips of aluminum or tin, and they are bent over the ends of the leaves and are secured there to clamp the cushions to the aluminum by rivets or other suitable means.

The square shaped shoulders 14 of the transverse grooves of the pads, receive the points and barbs of the hooks, which are pressed and embedded in them, and are consequently always kept clean, dry, and free from rust. These cushioning pads are made of a length to contain a plurality of these hook receiving shouldered grooves; as illustrated I have shown eight grooves in each pad at each end, but the pads may be made of a length to form more or less of these shouldered grooves, as desired, and they may be arranged at different distances apart and be made also of different widths.

In Fig. 6 I illustrate a slight modification of the construction shown in Figs. 1 and 2 in the arrangement of the leaf. In this arrangement a cushioning pad 19 extends either in one continuous piece throughout the length of the body portion of the leaf, or pad pieces are secured to the body portion with their ends close together, and in either case are preferably arranged in this manner on both sides of an aluminum core or body portion, and the hooks 20 are arranged in four single row transversely arranged groups, one group being positioned adjacent to each end, and the others at equal distances from the center of its length. This arrangement is particularly adapted for holding long shanked and long snelled bait hooks that are extensively used for bass, pickerel, pike and other fish in large lakes and for sea fishing.

The operation of placing fly and other hooks on one of my improved fly and other hook holding leaves, is as follows: The book containing one or more leaves is held in one hand open to the leaf it is desired to place a fly or flies on; the snell is then grasped by the other hand, and its loop end 10 is inserted over the upturned end of one of the metal hooks, and the loop is drawn under the downward curved stop portion; the snell then has about a half inch sliding movement on the metal snell holding hook. Then the hand is moved to the fish catching hook of the fly, and its point is placed behind the shoulder of the groove farthest away that the length of snell of the fly will allow it to reach, which will hold the snell substantially straight between its snell holding hook and the shoulder at which its point is placed. The point and its barb are then pressed into the shoulder of the cushioning pad, which firmly secures the hook to the leaf, while the snell has a compensating sliding movement on its holding hook that keeps it in straight alinement with its hook. A large number of fly and other snelled hooks having snells and hooks of considerable range in length and size, can be placed on the two sides of one of my improved leaves, and a book of five leaves, as shown in Fig. 2, of the size adapted to hold trout fishing artificial flies, the snells of which as made by the leading manufacturers in this country vary only about from an inch to an inch and a half in length, will hold about 120 flies, and inasmuch as my improved fly book leaf is preferably a loose leaf adapted for loose leaf fly books, more leaves can be added as desired.

My invention provides a novel and thoroughly practical fly book that would hold a very much larger range of flies and other snelled hooks than any at present on the market, and hold them individually separated from each other and straight, and the loose readily attachable or removable leaf feature is also a novel and advantageous one that will be appreciated by users.

The preferred construction and arrangement of my improved loose fly book leaf presents an easily made, substantial construction that will not be expensive to make, but I do not wish to be limited to the construction and arrangement shown, as many changes might be made without departing from the spirit of my invention.

Having described my invention, what I claim as new and desire to secure by Letters Patent, is:

1. A leaf for holding snelled fly and other hooks, comprising a body or core leaf portion, a hook cushion pad secured on each of the opposite sides of said body or core leaf portion, of cork or other suitable material, and a plurality of long hooks secured to said body or core portion and projecting through and arranged above said hook cushions, positioned to receive the loop ends of snells, and said hook cushions arranged to allow the points of fish hooks to be pressed into them.

2. A looped snelled fly and other loop snelled hook holding leaf, comprising a sheet of aluminum, said aluminum leaf body portion being provided with hooks arranged in any predetermined order on its opposite sides and adapted to receive the loop ends of the snells of said fly and other hooks, and hook point receiving cushions of cork secured to the opposite sides of said leaf body portion, said cushions being provided with transversely arranged grooves having shouldered or wall portions adapted to receive the points of said hooks, said aluminum body portion's hooks being composed of long tongue-like portions cut out on three of their sides, from said aluminum body portion in any predetermined or desired order of arrangement, and arranged and adapted to be extended through said cork hook point cushioning pads, and then to be bent into hooks adapted to receive the loop ends of said snells.

3. In a looped snell and other hook holding leaf for fly holding hooks, a leaf provided with hooks adapted to receive said snells, said hook members being cut from the said body portion of said leaf in the form of long tongue members that are freed from the body on three of their sides and remain integral with the body portion of the leaf, with flat pad shaped cork cushions arranged and adapted to receive points of hooks, said snell receiving hook members of said aluminum body portion being arranged to extend through the cork cushion and to be bent into hook forms over the surface of said cork cushions, and arranged and adapted to receive the loops of said snelled hooks, said cork cushions and said hooks being arranged and secured on both sides and end portions of said leaf.

4. A loose leaf for fly books, said loose leaf comprising a body portion of aluminum, of the size of the leaf, flat pad shaped hook point receiving cushions of cork extending over the opposite end portions of the body portion of said leaf on both sides of it, lug portions formed on the ends and one side edge of the body portion of said leaf, the inner side edge of the body portion of said leaf being arranged to project a short distance beyond said pads and being formed with apertures arranged and adapted to receive the said binding rings of loose leaf covers, said hook point cushioning pads being provided with a continuous row of grooved or channeled recesses, each having a shouldered side extending down into the pad from its top surface, and with an inclined side extending upwardly from the bottom of the shoulder to the top surface of said pad, and a plurality of small receiving hooks comprising tongue portions cut from the metal of said body portion and arranged to project through the pads and to be bent into snell receiving hooks, said snell receiving hooks being arranged in any predetermined order on said leaf.

In testimony whereof I affix my signature in presence of two witnesses.

GEORGE H. FATH.

Witnesses:
G. SARGENT ELLIOTT,
ELIZABETH SMITH.